(12) United States Patent
Nau et al.

(10) Patent No.: US 7,648,084 B2
(45) Date of Patent: Jan. 19, 2010

(54) DOSING DEVICE

(75) Inventors: Michael Nau, Dornhan/Aischfeld (DE); Marc Bareis, Markgroeningen (DE); Frank Ilgner, Stuttgart (DE); Horst Harndorf, Schauenburg (DE)

(73) Assignee: Robert Bosch GmbH, Stuttgart (DE)

( * ) Notice: Subject to any disclaimer, the term of this patent is extended or adjusted under 35 U.S.C. 154(b) by 747 days.

(21) Appl. No.: 10/520,217

(22) PCT Filed: Jun. 24, 2003

(86) PCT No.: PCT/DE03/02088

§ 371 (c)(1), (2), (4) Date: Aug. 10, 2005

(87) PCT Pub. No.: WO2004/004889

PCT Pub. Date: Jan. 15, 2004

(65) Prior Publication Data

US 2006/0099088 A1  May 11, 2006

(30) Foreign Application Priority Data

Jul. 3, 2002  (DE) .................... 102 29 904

(51) Int. Cl.
*B05B 15/00* (2006.01)

(52) U.S. Cl. .................. 239/397.5; 239/128; 239/419; 239/433; 239/434; 239/584; 239/585.1; 423/652; 48/215

(58) Field of Classification Search .................. 239/128, 239/397.5, 418, 419, 426, 427, 433, 434, 239/560, 561, 567, 584, 585.1, 585.4, 585.5; 123/297; 423/235, 652; 48/215
See application file for complete search history.

(56) References Cited

U.S. PATENT DOCUMENTS

| | | | |
|---|---|---|---|
| 3,971,847 A | | 7/1976 | Houseman |
| 5,449,120 A | * | 9/1995 | Tani et al. ................. 239/397.5 |
| 5,484,577 A | | 1/1996 | Watkins et al. |
| 6,045,772 A | * | 4/2000 | Szydlowski et al. ......... 423/652 |
| 6,412,450 B1 | * | 7/2002 | Jaasma ..................... 239/397.5 |
| 6,872,379 B2 | * | 3/2005 | Zahringer et al. ............. 48/215 |
| 7,086,376 B2 | * | 8/2006 | McKay ....................... 123/297 |

FOREIGN PATENT DOCUMENTS

| | | |
|---|---|---|
| DE | 28 43 534 | 4/1979 |
| DE | 44 40 023 | 6/1995 |
| DE | 199 37 444 | 1/2001 |
| DE | 100 02 000 | 8/2001 |
| DE | 100 02 004 | 8/2001 |
| DE | 100 02 414 | 8/2001 |
| EP | 0 508 362 | 10/1992 |

* cited by examiner

*Primary Examiner*—Steven J Ganey
(74) *Attorney, Agent, or Firm*—Kenyon & Kenyon LLP

(57) ABSTRACT

A dosing mechanism for fuels, particularly for the input into a chemical reformer to obtain hydrogen, has a metering-in device for metering fuel into a supply line, which opens out at at least one dosing aperture into a transporting line transporting a tempered material flow. A holding device for accommodating the metering-in device has an insulating body which thermally insulates the metering-in device from the transporting line that transports the tempered material flow.

27 Claims, 1 Drawing Sheet

DOSING DEVICE

FIELD OF THE INVENTION

The present invention relates to a dosing mechanism for chemical reformers used in transportation systems.

BACKGROUND INFORMATION

In fuel cell-supported transportation systems, chemical reformers are used for obtaining the required hydrogen from hydrocarbon-containing fuels.

All the substances needed by the reformer for the course of the reaction, such as air, water and fuel are ideally supplied to the reformer in the gaseous state. However, since the fuels, such as methanol or gasoline, are generally present onboard the transportation system in liquid form, shortly before they are supplied to the reformer, they have to be heated first so as to vaporize them. This requires a pre-evaporator that is in a position to make available corresponding quantities of gaseous fuel and water vapor, the waste heat from the reformer mostly being used for the vaporization.

Since the hydrogen is mostly used immediately, chemical reformers have to be in a position to adjust the production of hydrogen to the demand, without delay, e.g. at load changes or launching phases. Especially in the cold-start phase, additional measures have to be taken, since the reformer does not make available any waste heat. Conventional evaporators are not in a position to generate the corresponding quantities of gaseous reactants without delay.

It is therefore useful to enter the fuel, by using an atomizing device, in finely divided form into the reformer. The vaporization process, at sufficient heat supply, is improved by the large surface area of the finely divided fuel.

Devices for reforming fuels are described in, for example, U.S. Pat. No. 3,971,847. In this document, the fuel is metered by metering devices that are relatively distant from the reformer, via long supply lines, into a material flow that has been brought to the right temperature and dispersed in the material flow via a dosing aperture at the end of the supply line, and this flows to the location of the actual reforming process.

In the devices disclosed, it is particularly disadvantageous that the long supply lines lead to delays and inaccuracies in fuel metering, especially in the case of strong load changes or hot-start phases. If, after a stop phase, for example, while the fuel is evaporating under the temperature influence of the supply line, fuel metering is resumed, this may lead to delayed dosing of fuel into the tempered substance stream and to the reforming process because of the dead-space volume in the supply line that has first to be replenished. The same problem arises at particularly slight load. Furthermore, long supply lines act counter to compact construction, increase error susceptibility and assembly expenditure.

SUMMARY OF THE INVENTION

By contrast, the dosing mechanism according to the present invention has the advantage that, because of the thermal decoupling of the metering device from the transporting line that transports the tempered material flow, the length of the supply line between the metering device and the dosing aperture, and thus the dead-space volume present in it, is greatly reduced. Because of the clearly reduced dead-space volume, there is a clear improvement especially in the hot-start characteristics, the starting characteristics after a longer standstill and the low-load characteristics of the dosing mechanism and the reformer.

The metering device may be mounted near the transporting line that transports the tempered substance stream, and thus a compact, reliable and cost-effective construction of the reformer is made possible. In addition, the metering devices do not have to be sufficient for increased requirements with regard to temperature loadability and temperature characteristics, and thus conventional fuel injectors can be installed.

Advantageously, as the metering device, a fuel injector is used, as is known, for example, from reciprocating engines using internal combustion. The use of such valves has several advantages. They permit a particularly accurate control and regulation of metering fuel, the metering being able to be controlled via several parameters, such as the on-off ratio, the pulse frequency and possibly the stroke length. In this context, the dependence on pump pressure is considerably less marked than in metering devices which regulate the volume flow of the fuel via the line cross section, and the dosing range is clearly greater. In addition, the fuel injectors are frequently proven components, whose characteristics are known, which are cost-effective, and chemically stable to fuels and reliable components. This applies in particular to low pressure fuel injectors, which may be used in this instance because of their thermal decoupling.

The insulating body may be made of a ceramic material, since ceramic materials are particularly heat-resistant and conduct heat poorly. Additionally, if the insulating body is made up of several parts, that makes its assembly and its disassembly substantially easier. If the insulating body encloses the transporting line in an annular fashion, a form-locking connection to the transporting line is established thereby.

The insulating body is advantageously grasped by a clamp, such as a ring-shaped clamp, and is fastened by fastening elements. Since ceramic materials may be difficult to work on and are brittle, the insulating body may be at least partially surrounded by a non-ceramic, in particular a metallic jacket part in a form-locking manner, in order thus to be able to connect other components to the insulating body in a force-locking manner. By grasping the insulating body using a clamp, and the at least partial enclosing of the insulating body by the jacket part, it is possible to position the jacket part in a heat-insulating manner by using the clamp and the fastening element.

The holding crosspiece, having the which takes up the fuel injector, may be connected via a detachable joint, such as a screw connection. This has a positive influence on the assembling characteristics, and enables the protection of the accommodation from heat from the holding crosspiece, for instance, by nonmetallic washers. By the flat design of the holding crosspieces, a reduced heat-conducting cross section is achieved, along with good mechanical stability.

If the dosing aperture is positioned approximately in the radial center of the transporting line, the input fuel may be distributed particularly uniformly. A particularly good and fine distribution of the fuel may also be achieved by using several dosing apertures, in particular, several dosing apertures having different hole diameters, these also being able to be directed radially to the flow direction of the tempered substance stream. A particularly advantageous distribution of the fuel is also achieved by the input of fuel counter to the flow direction of the tempered substance stream.

Advantageously, the transporting line has a cross sectional constriction in its axial course. This enables the fuel clearly to mix better with the substance stream, and because of the thereby improved transition of heat to the fuel, it is clearly able to be evaporated faster.

For better heat uptake from the reformer, the supply line may be formed using means, such as heat vanes, for the improvement of heat absorption. These are advantageously mounted on the supply line by durable, stable, heat-resistant and well heat-conducting bonding methods, such as welding or soldering.

The dosing pipe advantageously has a number of locations at which the wall thickness is reduced, which lower the heat conductivity of the pipe and may also be used as cooling elements.

DETAILED DESCRIPTION

Figure 1:
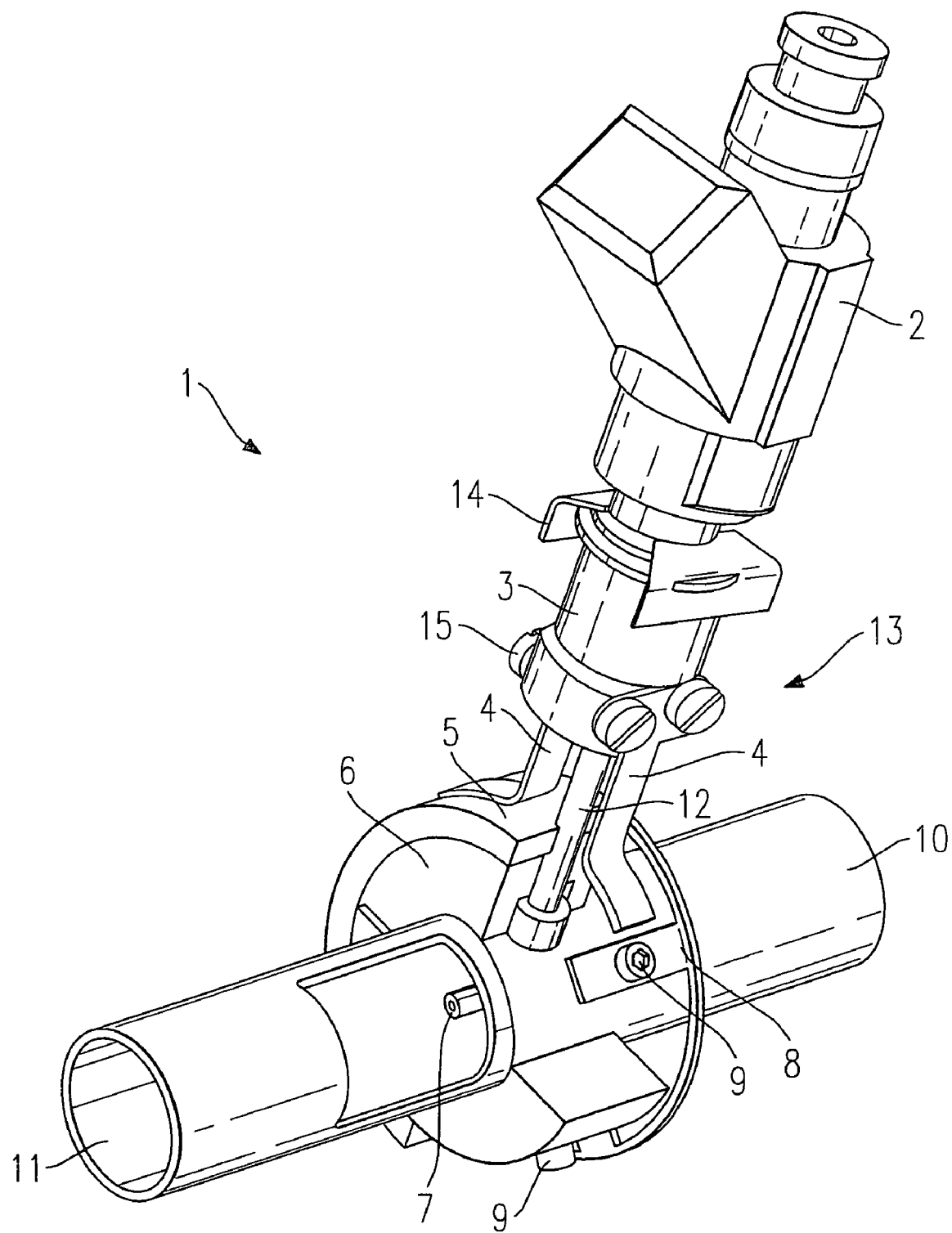
FIG. 1 shows a schematic view of an exemplary embodiment of a dosing mechanism according to the present invention.

An exemplary embodiment of the present invention is described below as an example.

An exemplary embodiment, shown in FIG. 1, of a dosing mechanism 1 according to the present invention, may be implemented in the form of a dosing mechanism 1 for the use of low pressure fuel injectors. Dosing mechanism 1 is particularly suitable for the input and the atomization of fuel into a chemical reformer (not shown) so as to obtain hydrogen.

Dosing mechanism 1 is made up of a holding device 13, a metering-in device 2, which in this exemplary embodiment is designed in the form of a low-pressure fuel injector, a tube-shaped transporting line 10 that transports a tempered material flow, and a supply line 12 which opens out into a dosing opening 7 at one end lying in transporting line 10.

Holding device 13 is essentially made up of an accommodation 3 which is used to accommodate the part of metering-in device 2 at its outlet side and is fixed to it by a fixing element 14 in the form of a simple clamp, and a holding crosspiece 4 for connecting and distancing accommodation 3 and metering-in device 2 to/from a jacket part 5, which encircles an insulating body 6 that annularly surrounds transporting line 10. A clamp 8, that runs closely beside jacket part 5, likewise encircles transporting line 10, fixes the individual parts (in the exemplary embodiment, two half shells) of insulating body around transporting line 10. In this context, clamp 8 is fastened with the aid of fastening elements 9, which in this exemplary embodiment are screws, and which press on lateral widenings of clamp 8, and thus clamp insulating body 6.

Accommodation 3, with its recess facing away from transporting line 10, takes up the outlet part of metering-in device 2 with an exact fit. Because of the fit, and the use of a (not shown) seal in the (not shown) region of the (not shown) outlet opening of metering-in device 2, in this context, the outlet opening is connected hermetically sealed to supply line 12, which passes through the side of accommodation 3 facing transporting line 10. In this exemplary embodiment, one may do without stable joints between metering-in device 2 and accommodation 3, since a low-pressure fuel injector is used, which, as a rule, has fuel pressures of only up to about 10 bar applied to it. Consequently, no great forces have to be transmitted during sealing, such as by massive screw connections. All components that have pressure applied to them may thus be dimensioned to be less strong, and may be manufactured more cost-effectively.

At opposite sides, at the lower region of accommodation 3 facing transporting line 10, two holding crosspieces are fastened laterally with the aid of screws 15 that pass through holding crosspieces 4 and gripping within the internal threads of accommodation 3. For thermal insulation, at this point nonmetallic washers, for example, may be used between holding crosspiece 4 and accommodation 3. Holding crosspieces 4 continue from there on to jacket part 5 and are there fixed to jacket part 5 by a welding connection, holding crosspieces 4 being formed in this region in such a way that they follow the shape of jacket part 5, and thus a greater connecting area is achieved between holding crosspieces 4 and jacket part 5.

Coming from accommodation 3, supply line 12 runs between the two holding crosspieces 4, at right angles to transporting line 10, through a lateral opening running elongated in the direction of transporting line 10, through insulating body 6 and through the wall of transporting line 10 right up to dosing aperture 7, which is directed, in this exemplary embodiment, towards an outlet opening 11 of transporting line 10. The dosing aperture 7 is also able to be formed as a nozzle. Dosing aperture 7 introduces the fuel into a material flow that is brought to a temperature of, for example, between 400° C. and 600° C., and which is composed, for example, of a mixture of air and water vapor.

What is claimed is:

1. A dosing mechanism for dispensing liquid fuels into a chemical reformer to obtain hydrogen, comprising:
at least one metering in device for metering fuel into a supply line including at least one dosing aperture exposed to a flow of a high-temperature material; and
a holding device for accommodating the metering in device including an insulating body which thermally insulates the metering in device from a tube shaped transporting line;
wherein the flow of the high-temperature material is entrained in the tube shaped transporting line; and
wherein the insulating body is annular and encircles the transporting line.

2. The dosing mechanism of claim 1, wherein the insulating body includes a plurality of subcomponents.

3. The dosing mechanism of claim 2, wherein the insulating body is made of a ceramic material.

4. The dosing mechanism of claim 2, wherein the metering in device is a fuel injector.

5. The dosing mechanism of claim 4, wherein the fuel injector includes a low pressure fuel injection valve which operates at one of fuel and propellant pressures of up to 10 bar.

6. The dosing mechanism of claim 2, further comprising:
a clamp positioned to grasp the insulating body.

7. The dosing mechanism of claim 6, wherein the clamp is ring shaped.

8. The dosing mechanism of claim 6, wherein the clamp is fastened to the insulating body by at least one fastening element.

9. The dosing mechanism of claim 2, wherein a plurality of dosing apertures having different hole diameters are provided.

10. The dosing mechanism of claim 2, wherein the at least one dosing aperture is directed counter to the flow of the high-temperature material.

11. The dosing mechanism of claim 2, wherein the dosing aperture is directed radially with respect to a direction of the flow of the high-temperature material.

12. The dosing mechanism of claim 1, wherein the at least one dosing aperture opens out approximately at a lateral axial center of the transporting line.

13. A dosing mechanism for dispensing liquid fuels into a chemical reformer to obtain hydrogen, comprising:

at least one metering in device for metering fuel into a supply line including at least one dosing aperture exposed to a flow of a high-temperature material; and a holding device for accommodating the metering in device including an insulating body which thermally insulates the metering in device from an element containing the high-temperature material;

wherein the clamp is fastened to the insulating body by at least one fastening element;

further comprising:

a clamp positioned to grasp the insulating body; and a jacket partially surrounding the insulating body with an air gap.

14. The dosing mechanism of claim 13, wherein the jacket is made of a non ceramic material.

15. The dosing mechanism of claim 14, wherein the jacket is made of a metal.

16. The dosing mechanism of claim 14, wherein the jacket does not contact the clamp and the insulating body.

17. The dosing mechanism of claim 14, further comprising:

an accommodation part; and a holding crosspiece which fastens the accommodation part to the jacket.

18. The dosing mechanism of claim 17, wherein the holding crosspiece is coupled to the accommodation part by a detachable joint.

19. The dosing mechanism of claim 18, wherein the detachable joint includes a screw connection.

20. The dosing mechanism of claim 17, wherein the holding crosspiece is attached to the jacket by a joint.

21. The dosing mechanism of claim 20, wherein the joint includes one of a soldered and welded connection.

22. The dosing mechanism of claim 17, wherein the holding crosspiece is flat.

23. A dosing mechanism for dispensing liquid fuels into a chemical reformer to obtain hydrogen, comprising:

at least one metering in device for metering fuel into a supply line including at least one dosing aperture exposed to a flow of a high-temperature material; and a holding device for accommodating the metering in device including an insulating body which thermally insulates the metering in device from a tube shaped transporting line;

wherein the flow of the high-temperature material is entrained in the tube shaped transporting line; and wherein the transporting line has an axis including a cross sectional constriction.

24. The dosing mechanism of claim 23, wherein a dosing pipe extends at a right angle to the axis of the transporting line.

25. A dosing mechanism for dispensing liquid fuels into a chemical reformer to obtain hydrogen, comprising:

at least one metering in device for metering fuel into a supply line including at least one dosing aperture exposed to a flow of a high-temperature material; and a holding device for accommodating the metering in device including an insulating body which thermally insulates the metering in device from an element containing the high-temperature material;

wherein the supply line includes heat conducting vanes for improving heat absorption.

26. The dosing mechanism as recited in claim 25, wherein the heat conducting vanes are fastened to the supply line by one of soldering and welding.

27. A dosing mechanism for dispensing liquid fuels into a chemical reformer to obtain hydrogen, comprising:

at least one metering in device for metering fuel into a supply line including at least one dosing aperture exposed to a flow of a high-temperature material; and a holding device for accommodating the metering in device including an insulating body which thermally insulates the metering in device from an element containing the high-temperature material;

wherein the supply line includes heat conducting vanes for improving heat absorption; and wherein the supply line has at least one of a wall-thickness reduced location and a wall-thickness reduced region in its axis.

\* \* \* \* \*

UNITED STATES PATENT AND TRADEMARK OFFICE
CERTIFICATE OF CORRECTION

PATENT NO. : 7,648,084 B2
APPLICATION NO. : 10/520217
DATED : January 19, 2010
INVENTOR(S) : Nau et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1197 days.

Signed and Sealed this

Sixteenth Day of November, 2010

David J. Kappos
*Director of the United States Patent and Trademark Office*